US008212206B2

(12) United States Patent
Patterson et al.

(10) Patent No.: US 8,212,206 B2
(45) Date of Patent: Jul. 3, 2012

(54) ANALYSIS METHODS, ANALYSIS DEVICE WAVEFORM GENERATION METHODS, ANALYSIS DEVICES, AND ARTICLES OF MANUFACTURE

(75) Inventors: Garth E. Patterson, Brookston, IN (US); James Mitchell Wells, Lafayette, IN (US); Brent Rardin, Lafayette, IN (US)

(73) Assignee: Griffin Analytical Technologies, L.L.C., West Lafayette, IN (US)

( * ) Notice: Subject to any disclaimer, the term of this patent is extended or adjusted under 35 U.S.C. 154(b) by 1405 days.

(21) Appl. No.: 10/570,707

(22) PCT Filed: Sep. 3, 2004

(86) PCT No.: PCT/US2004/029028

§ 371 (c)(1), (2), (4) Date: Feb. 27, 2007

(87) PCT Pub. No.: WO2005/024381

PCT Pub. Date: Mar. 17, 2005

(65) Prior Publication Data

US 2007/0162232 A1 Jul. 12, 2007

Related U.S. Application Data

(60) Provisional application No. 60/500,542, filed on Sep. 5, 2003, provisional application No. 60/500,482, filed on Sep. 4, 2003.

(51) Int. Cl.
*B01D 59/44* (2006.01)

(52) U.S. Cl. ........................................ 250/282; 250/283

(58) Field of Classification Search ........................ None
See application file for complete search history.

(56) References Cited

U.S. PATENT DOCUMENTS

| | | | | | |
|---|---|---|---|---|---|
| 3,633,173 | A | * | 1/1972 | Edge | 711/217 |
| 4,008,388 | A | * | 2/1977 | McLafferty et al. | 702/27 |
| 4,567,897 | A | * | 2/1986 | Endo et al. | 600/443 |
| 4,644,494 | A | * | 2/1987 | Muller | 711/152 |
| 4,761,545 | A | * | 8/1988 | Marshall et al. | 250/291 |
| 4,912,326 | A | * | 3/1990 | Naito | 850/10 |
| 4,945,234 | A | * | 7/1990 | Goodman et al. | 250/291 |
| 4,945,236 | A | * | 7/1990 | Mogami et al. | 850/9 |
| 4,956,788 | A | | 9/1990 | Guan et al. | |

(Continued)

FOREIGN PATENT DOCUMENTS

DE 4008388 A1 * 9/1991

(Continued)

OTHER PUBLICATIONS

PCT/US04/29029; Filed Sep. 3, 2004; "Analysis Device Operational Methods and Analysis Device Programming Methods"; Rardin et al.

(Continued)

*Primary Examiner* — David A Vanore
*Assistant Examiner* — Andrew Smyth
(74) *Attorney, Agent, or Firm* — Well St. John, PS

(57) ABSTRACT

In one implementation, an analysis device operational method includes providing a plurality of levels of programming abstraction corresponding to programming of an analysis device configured to analyze a sample, receiving input data corresponding to one of the levels of programming abstraction, processing the input data to generate analysis control data, and implementing an operation with respect to analysis of the sample using the analysis control data.

12 Claims, 5 Drawing Sheets

U.S. PATENT DOCUMENTS

| | | | | | |
|---|---|---|---|---|---|
| 5,015,848 | A | * | 5/1991 | Bomse et al. | 250/281 |
| 5,248,882 | A | * | 9/1993 | Liang | 250/291 |
| 5,302,826 | A | * | 4/1994 | Wells | 250/292 |
| 5,324,939 | A | * | 6/1994 | Louris et al. | 250/292 |
| 5,436,447 | A | * | 7/1995 | Shew | 250/291 |
| 5,457,315 | A | * | 10/1995 | Wells et al. | 250/282 |
| 5,696,376 | A | * | 12/1997 | Doroshenko et al. | 250/292 |
| 5,760,785 | A | * | 6/1998 | Barber et al. | 345/440 |
| 5,793,038 | A | * | 8/1998 | Buttrill, Jr. | 250/282 |
| 6,215,146 | B1 | * | 4/2001 | Umeda et al. | 257/315 |
| 6,279,379 | B1 | * | 8/2001 | Logue et al. | 73/24.01 |
| 6,287,988 | B1 | * | 9/2001 | Nagamine et al. | 438/770 |
| 6,472,661 | B1 | * | 10/2002 | Tanaka et al. | 250/281 |
| 6,472,684 | B1 | * | 10/2002 | Yamazaki et al. | 257/72 |
| 6,476,537 | B1 | | 11/2002 | Pease et al. | |
| 6,489,649 | B2 | * | 12/2002 | Kobayashi et al. | 257/314 |
| 6,496,905 | B1 | * | 12/2002 | Yoshioka et al. | 711/154 |
| 6,509,602 | B2 | * | 1/2003 | Yamazaki et al. | 257/314 |
| 6,549,861 | B1 | * | 4/2003 | Mark et al. | 702/76 |
| 6,577,531 | B2 | * | 6/2003 | Kato | 365/185.01 |
| 6,596,585 | B2 | * | 7/2003 | Kobayashi et al. | 438/257 |
| 6,621,077 | B1 | * | 9/2003 | Guevremont et al. | 250/292 |
| 6,646,254 | B2 | * | 11/2003 | Tanaka | 250/288 |
| 6,683,303 | B2 | * | 1/2004 | Yoshinari et al. | 250/292 |
| 6,710,336 | B2 | * | 3/2004 | Wells | 250/292 |
| 6,750,449 | B2 | * | 6/2004 | Marcus | 250/288 |
| 6,753,523 | B1 | * | 6/2004 | Whitehouse et al. | 250/292 |
| 6,756,640 | B2 | * | 6/2004 | Yamazaki et al. | 257/347 |
| 6,759,706 | B2 | * | 7/2004 | Kobayashi | 257/314 |
| 6,764,902 | B2 | * | 7/2004 | Kobayashi et al. | 438/257 |
| 6,815,673 | B2 | * | 11/2004 | Plomley et al. | 250/292 |
| 6,835,927 | B2 | * | 12/2004 | Becker et al. | 250/282 |
| 6,906,322 | B2 | * | 6/2005 | Berggren et al. | 250/288 |
| 7,015,466 | B2 | * | 3/2006 | Takats et al. | 250/288 |
| 7,043,406 | B1 | * | 5/2006 | Welkie et al. | 702/194 |
| 7,230,601 | B2 | * | 6/2007 | Yamazaki et al. | 345/92 |
| 7,339,820 | B2 | * | 3/2008 | Kato | 365/185.01 |
| 7,439,121 | B2 | * | 10/2008 | Ohmi et al. | 438/211 |
| 7,449,170 | B2 | * | 11/2008 | Regnier et al. | 424/1.11 |
| 2001/0038555 | A1 | * | 11/2001 | Kato | 365/185.17 |
| 2001/0040252 | A1 | * | 11/2001 | Kobayashi et al. | 257/314 |
| 2001/0050337 | A1 | * | 12/2001 | Tanaka | 250/288 |
| 2002/0005479 | A1 | * | 1/2002 | Yoshinari et al. | 250/288 |
| 2002/0009852 | A1 | * | 1/2002 | Kobayashi et al. | 438/261 |
| 2002/0070406 | A1 | * | 6/2002 | Yamazaki et al. | 257/314 |
| 2002/0113268 | A1 | * | 8/2002 | Koyama et al. | 257/359 |
| 2002/0158829 | A1 | * | 10/2002 | Yamazaki et al. | 345/92 |
| 2002/0166961 | A1 | * | 11/2002 | Berggren et al. | 250/288 |
| 2002/0190201 | A1 | * | 12/2002 | Yamada et al. | 250/288 |
| 2003/0052263 | A1 | * | 3/2003 | Kaufman et al. | 250/281 |
| 2003/0107077 | A1 | * | 6/2003 | Yamazaki et al. | 257/314 |
| 2003/0111596 | A1 | * | 6/2003 | Becker et al. | 250/282 |
| 2003/0113936 | A1 | * | 6/2003 | Yamamoto | 436/173 |
| 2003/0150988 | A1 | * | 8/2003 | Wells | 250/292 |
| 2003/0176038 | A1 | * | 9/2003 | Kobayashi et al. | 438/257 |
| 2003/0202382 | A1 | * | 10/2003 | Kato | 365/185.28 |
| 2004/0042307 | A1 | * | 3/2004 | Ohmi et al. | 365/212 |

FOREIGN PATENT DOCUMENTS

| | | | | |
|---|---|---|---|---|
| JP | 63318061 | A | * | 12/1988 |
| JP | 2000314724 | A | * | 11/2000 |

OTHER PUBLICATIONS

PCT/US04/29028; Filed Sep. 3, 2004; International Search Report mailed Jan. 26, 2007; 3 pp.

PCT/US04/29028; Filed Sep. 3, 2004; Written Opinion of the International Searching Authority; mailed Jan. 26, 2007; 7 pp.

* cited by examiner

ANALYSIS METHODS, ANALYSIS DEVICE WAVEFORM GENERATION METHODS, ANALYSIS DEVICES, AND ARTICLES OF MANUFACTURE

CLAIM FOR PRIORITY

This application claims priority to U.S. Provisional Patent Application Ser. No. 60/500,482, filed Sep. 4, 2003, entitled "Analysis Device Operational Methods And Analysis Device Programming Methods", and the teachings are incorporated by reference herein.

RELATED PATENT DATA

This application is a 35 U.S.C. §371 of and claims priority to PCT International Application Number PCT/US04/29028, which was filed 3 Sep. 2004 (03.09.04), and was published in English, which claims priority under 35 U.S.C. §119 to U.S. Provisional Patent Application No. 60/500,542 which was filed 5 Sep. 2003 (05.09.03), the entirety of each are incorporated herein by reference.

GOVERNMENT RIGHTS STATEMENT

This invention was made with Government support under SBIR Phase II contract DABJ19-03-C-0001 awarded by the U.S. Army. The Government has certain rights in the invention.

TECHNICAL FIELD

The present invention relates generally to the field of analysis device operational methods and analysis device programming methods.

BACKGROUND OF THE INVENTION

Mass spectrometry is capable of providing qualitative and quantitative information about a composition of both inorganic and organic samples. Mass spectrometry may be used to determine the structures and identities of a wide variety of complex molecular species. Mass spectrometers have been utilized to provide high-speed analysis of complex mixtures enhancing capacity for structure determination. High-capacity and high-speed analysis are two important factors in analytical instrumentation.

U.S. Pat. No. 5,015,848 to Bomse, et al. describes methods and apparatus for utilizing analog or digital data acquisition and processing, and the teachings of which are hereby incorporated by reference. U.S. Pat. No. 6,253,162 to Jarman, et al. describes a method of identifying features in indexed analytical data for distinguishing a signal from noise and the teachings of which are hereby incorporated by reference. U.S. Pat. No. 6,487,523 to Jarman, et al. describes a method and apparatus for characterizing the presence of peaks in an indexed dataset for samples that match a reference species and the teachings of which are hereby incorporated by reference.

A number of different end users may access a given analysis tool to perform analysis operations. The end users may have different levels of experience with instrument usage and/or familiarity with programming the instrument. Further, the aim of one group of users may differ from another group of users. For example, chemists and non-technical users may focus on chemical analysis and not intricate details of mass spectrometry. However, some instruments have provided relatively inflexible user interface designs which may be overly complicated for novice users, or overly simplistic for sophisticated users.

Aspects of this disclosure provide analysis device operational methods and analysis device programming methods.

BRIEF DESCRIPTION OF THE DRAWINGS

Aspects of the disclosure are described below with reference to the following accompanying drawings.

DETAILED DESCRIPTION OF THE EMBODIMENTS

Figure 1:
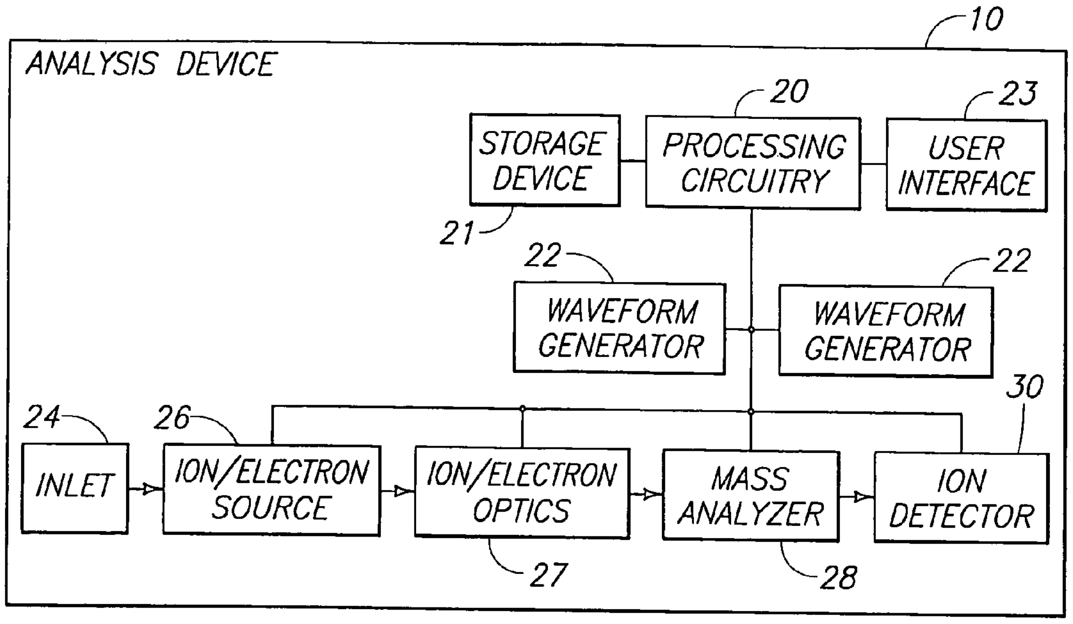
FIG. 1 is a block diagram of an analysis device according to one embodiment.

Referring to FIG. 1, an analysis device 10 is illustrated in accordance with one embodiment. In one implementation, analysis device 10 is configured to perform mass spectrometry analysis operations. For example, analysis device 10 is arranged as a mass spectrometer to analyze samples (e.g., chemical compositions) in one embodiment. Exemplary subject samples include inorganic and organic substances in solid, liquid, and/or vapor form. Secondary analyses may be performed resulting in further data generation and/or molecular information (e.g., device 10 embodied as a MS/MS or $MS^n$ device).

The depicted exemplary embodiment of analysis device 10 comprises processing circuitry 20, a storage device 21, one or more waveform generator 22, a user interface 23, an inlet 24, an ion/electron source 26, ion/electron optics 27, a mass analyzer 28, and an ion detector 30. Other embodiments are possible including more, less or alternate components.

Processing circuitry 20 is configured to define values of various device parameters for example of ion/electron source 26, ion/electron optics 27, mass analyzer and/or ion detector 30 (or other components which may be controlled) and may include a value which remains constant for the parameter during the analysis of a sample, or a stream of values for a device parameter providing one or more waveforms (e.g., waveforms applied to mass analyzer 28). Accordingly, the values of device parameters of components 26, 27, 28, 30 may individually comprise a value which remains constant for a respective device parameter during an analysis of a sample or a plurality of values for a given parameter during an analysis of a device sample (e.g., a waveform). Processing circuitry 20 may generate analysis control data to implement operations of device 10 with respect to analysis of a sample, for example, the analysis control data may include values of the device parameters. As described herein, the analysis control data may be generated responsive to received input data. At least some aspects present different levels of programming abstraction, for example via a user interface, to assist a user with entry of the input data used to generate the analysis control data.

According to exemplary aspects, processing circuitry 20 is configured to generate, access or otherwise provide one or more waveforms or waveform segments which may be applied to mass analyzer 28 to implement analysis operations of device 10. User input data may define waveform segments usable to control the analysis and may be provided in a given form (e.g., equation) which defines the waveform data to be used to implement analysis operations. The waveform segments may be processed to provide analysis control data which may comprise the waveform data of the segments. Thereafter, the waveform data (e.g., digitized voltage values) may be outputted to other components (e.g., generators 22) to implement analysis operations with respect to a subject sample. As discussed herein, different levels of programming abstractions may be generated to assist a user with entry of input data which is processed to provide exemplary analysis control data such as the above-described waveform data. Different input data may include voltage amplitude values, the above-described equation, values for equation parameters, or other appropriate format or content.

Processing circuitry 20 may control additional operations of analysis device 10 with respect to performing analysis operations of a sample. For example, processing circuitry 20 may control or monitor operations of components 24, 26, 27, 28, and/or 30 to analyze a sample. Additional details regarding exemplary control or implementation of analysis operations by processing circuitry 20 are described in illustrative embodiments in a co-pending PCT application entitled "Analysis Methods, Analysis Device Waveform Generation Methods, Analysis Devices, and Articles of Manufacture," naming Garth E. Patterson, James Mitchell Wells, and Brent Rardin as inventors, filed the same day as the present application, and the teachings of which are incorporated herein.

Processing circuitry 20 may also control user interface 23 to display a programming interface and/or a configuration interface according to exemplary embodiments. As described further below, the programming interface may comprise an interface to assist a user with programming operations of device 10 (e.g., exemplary programming includes specifying values of various device parameters and may comprise a single value or plural values for waveforms to be generated). The programming interface may be provided to receive or implement programming in a plurality of levels of programming abstraction in one embodiment corresponding to the sophistication and/or experience of the user of device 10 (e.g., a user may enter different forms of input data used to create analysis control data via the different levels of programming abstraction, for example, based upon the choice of the user). As also described below, the configuration interface, may be used by a user to modify the programming interfaces (e.g., add additional constructs or otherwise program) at one or more of the levels of abstraction to tailor programming capabilities of the device 10 to the needs of the user.

Processing circuitry 20 may be implemented as a processor or other structure configured to execute executable instructions including, for example, software and/or firmware instructions. Other exemplary embodiments of processing circuitry 20 include hardware logic, PGA, FPGA, ASIC, and/or other structures. These examples of processing circuitry 20 are for illustration and other configurations are possible.

Storage device 21 is configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Waveform generators 22 are configured to receive the generated waveform data and to provide the respective voltage waveforms according to respective gains. The amplified voltage waveforms are outputted to mass analyzer 28 in the depicted embodiment. Waveform generators 22 may provide any digital-to-analog conversion operations using the waveform data to provide the waveforms before amplification. Other components of device 10 (e.g., components 26, 27, 28, 30) may comprise appropriate conditioning circuitry (e.g., analog to digital circuitry to convert analysis control data received from processing circuitry 20 to constant or varying digital and/or analog signals to implement analysis operations).

User interface 23 is configured to provide interaction between a user and analysis device 10. Exemplary user interfaces 23 comprise CRT or LCD displays configured to depict programming and/or configuration interfaces (e.g., using a Windows™ operating system or other suitable format or environment) for review by a user as well as input devices configured to receive input from a user (e.g., keyboard, mouse, etc.). Other configurations of user interface 23 are possible.

Inlet 24 is configured to introduce a sample for analysis. Exemplary inlets 24 comprise batch inlets, direct probe inlets, chromatographic inlets, and permeable or capillary membrane inlets. Other configurations are possible.

Ion/electron source 26 is operatively coupled with inlet 24 and arranged to receive the sample from inlet 24. Ion/electron source 26 is configured to convert components of the sample into ions and/or electrons according to exemplary device parameters including bias voltage and ionization time which may be specified by analysis control data provided by processing circuitry 20. Users may specify input data which may define the analysis control data via different levels of programming abstraction as described herein. Exemplary conversion operations may be implemented by bombarding the sample with electrons, ions, molecules, and/or photons, or by applying thermal and/or electrical energy. Other conversion operations are possible.

Ion optics 27 are configured to control the transmission of ions or electrons to mass analyzer 28. Ion optics 27 operate according to device parameters including for example DC voltage potentials (e.g., −100 VDC to −150 VDC) for ions or DC voltage potentials of different polarity which may be specified by analysis control data provided by processing circuitry 20. Users may specify input data which may define the analysis control data via different levels of programming abstraction as described herein.

Figure 2:
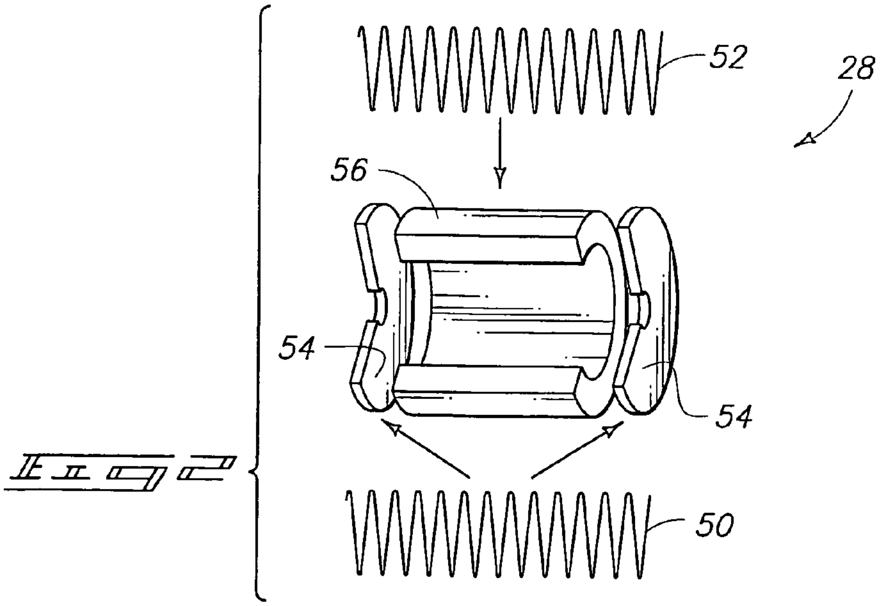
FIG. 2 is an illustrative representation of a mass analyzer of the analysis device according to one embodiment.

Ions or electrons from ion optics 27 are provided to mass analyzer 28. Additionally, the mass analyzer 28 also receives voltage waveforms from waveform generators 22. Referring to FIG. 2, a plurality of exemplary waveforms 50, 52 from respective amplifiers 22 are shown. Waveforms 50, 52 may comprise different waveforms for implementing analysis operations. The exemplary illustrated mass analyzer 28 includes a plurality of end-cap electrodes 54, and a ring electrode 56. Waveform 50 may be applied to end-cap electrodes 54 and waveform 52 may be applied to ring electrode 56. Waveforms 50, 52 are provided to manipulate ion motion for mass analysis and tandem mass analysis in exemplary methods. According to the depicted example wherein mass analyzer 28 comprises a two-waveform quadrupole ion trap mass analyzer, waveform 52 is applied to ring electrode 56 to trap ions, and waveform 50 is applied to end-cap electrodes 54 to manipulate ion content of the generated ion trap. In some embodiments, a waveform may be applied to one electrode 54 while the same waveform out of phase by 180° may be simultaneously applied in parallel to another electrode 54.

Other embodiments of mass analyzer 28 are possible. For example, in a three-waveform linear quadrupole mass analyzer (not shown), first and second waveforms may be applied to respective pairs of rod electrodes to guide ions through a linear quadrupole, and a third waveform may be superimposed onto one of a plurality of pairs of rod electrodes to manipulate ion motion as the ions pass through the linear quadrupole. Other waveforms and/or number of other waveforms may be used in other analysis operations.

Figure 3:
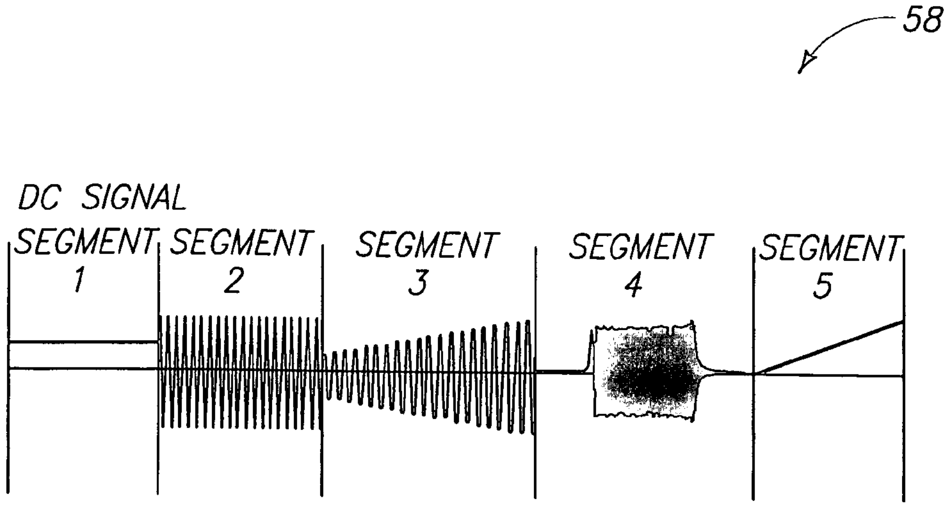
FIG. 3 is a graphical representation of an exemplary waveform which may be used to perform analysis operations according to one embodiment.

In the described embodiments, waveforms 50, 52 comprise voltage waveforms to be applied to one or more electrodes of mass analyzer 28. Waveforms 50, 52 may comprise a sequential combination of data resulting from one or more algorithm, and may be viewed as a sequence of segments in some arrangements. Referring to FIG. 3, a waveform 58 comprising a plurality of different segments defined according to input data including a plurality of user-definable or otherwise provided equations or formulas is illustrated. Different waveform segments may also be referred to as different waveforms herein. Input data including predefined or user-definable formulas may comprise or be used to specify any desired waveform equation. The illustrated exemplary waveform comprises five segments wherein the first segment comprises a fixed dc value, the second segment comprises a repeating sine wave, the third segment comprises a ramping sine wave, the fourth segment comprises a broadband wave, and the fifth segment comprises a ramping dc signal. Other waveform segments or combination of waveform segments may be used in other embodiments. Processing circuitry 20 may provide analysis control data comprising plural discrete values to define the waveform(s) responsive to input data which may be entered by a user via an interface providing different levels of programming abstraction described herein.

Processing circuitry 20 may provide analysis control data including values of one or more device parameter of ion detector 30 to control the operations of detector 30. For example, the processing circuitry 20 may provide a value for the parameter comprising bias voltage (e.g., specify a voltage in an exemplary range of 2000 to 2500 VDC). The value may comprise analysis control data generated responsive to input data received by a user in one embodiment. Users may specify input data which may define the analysis control data via different levels of programming abstraction as described herein.

Figure 4:
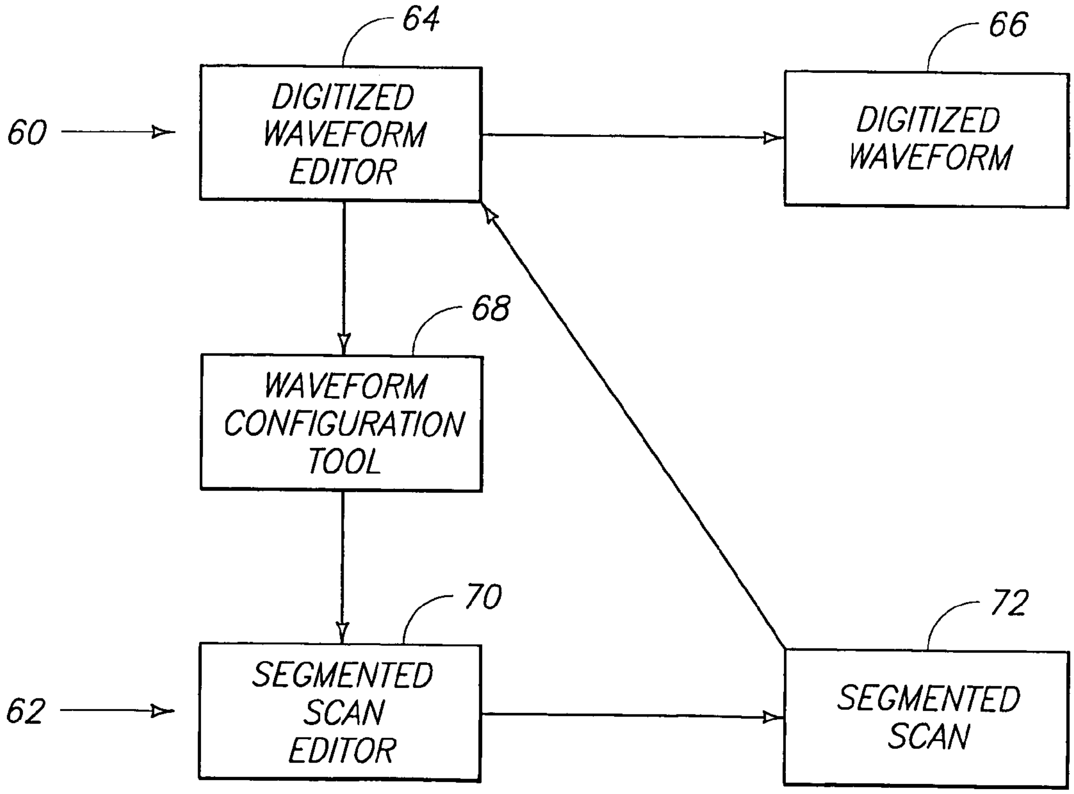
FIG. 4 is an illustrative representation of exemplary configuration and processing operations of the analysis device according to one embodiment.

Referring to FIG. 4, an illustrative example depicting a plurality of levels 60, 62 of programming abstraction are depicted. The amount and/or type of information obtained from a user to implement analysis operations of device 10 (i.e., input data) varies between the different levels 60, 62 of programming abstraction. For exemplary waveform programming of one or more waveform for components 26, 27, 28 and/or 30, a user may provide input data including one or more values of a waveform equation if programming a waveform via one of the levels, or alternatively, enter input data including the equation itself and value(s) thereof if programming the waveform via another of the levels. For programming a value of a device parameter (e.g., which remains constant during an analysis of a sample) of source 26, optics 27, analyzer 28, detector 30 or other components, a user may enter input data including a value of the respective device parameter via one level, or alternatively and for example, press an optimization entry as user input via another level wherein the processing circuitry 20 may calculate the value. Responsive to user input, the processing circuitry 20 may provide analysis control data comprising one or more values for one or more device parameter (e.g., waveform or constant) of the components 26, 27, 28, 30 (e.g., the processing circuitry 20 may run a calibration operation to determine a bias voltage for a described sensitivity of detector 30 or other parameter to provide the analysis control data responsive to user input). FIG. 4 is discussed with respect to defining waveforms although the different levels 60, 62 may be used to specify device components 26, 27, 28 and 30 other than waveforms (e.g., a single value of a device parameter which may remain constant during an analysis of a sample).

FIG. 4 also illustrates exemplary processing (e.g., compiling) and configuration aspects intermediate the different levels 60, 62. Levels 60, 62 illustrated in FIG. 4 are provided for convenience to describe operations and interfacing between levels. Additional levels of programming abstraction (i.e. more than two) may be provided in other embodiments.

In one embodiment, programming level 60 may correspond to a digitized voltage waveform level and programming level 62 may correspond to a segmented scan configuration level. Digitized voltage waveform level 60 may be intended for usage by experts in mass spectrometry physics. Level 60 may provide direct access and programming of values of device parameters, such as raw digitized data used to generate or otherwise corresponding to voltage waveforms or waveform segments which are outputted by waveform generators 22 to implement analysis operations.

Level 62 may be intended for usage by experts with how mass spectrometry works but not necessarily the pertinent physics. As described below, level 62 may query a user to provide input data which may be processed by processing circuitry 20 to generate raw data (e.g., values of device parameters). The depicted levels 60, 62 are exemplary to describe the provision of different levels of programming abstraction to a user. Other (alternative and/or additional) levels of programming abstraction may be provided in other embodiments.

As illustrated in the exemplary embodiment of FIG. 4, a digitized waveform editor 64 may be provided in level 60. Digitized waveform editor 64 may be implemented by processing circuitry 20 executing a text editor in one embodiment. Processing circuitry 20 may also be configured by appropriate programming to implement waveform configuration tool 68 and segmented scan editor 70 in one embodiment.

The digitized waveform editor 64 operates to output or provide raw data of the digitized waveforms 66 which may be provided to waveform generators 22 for generating voltage waveforms to implement and control analysis operations of the device 10. In one embodiment, the digitized waveform 66 comprise data streams defined as floating point values representing the actual voltages, integers to be scaled based on peak voltage and scale factors, mathematical equations or other representations. The exemplary level 60 gives a user direct access to the raw data (voltage) control of the analysis device 10. Exemplary digitized waveforms 66 may comprise multiple arrays of data that define voltage amplitudes for individual analog voltages to be generated and used to control analysis device 10. For example, the waveforms 66 may comprise one or more streams of digital data values which may be converted to one or more respective analog voltage waveform used to implement mass spectrometry operations.

Programming level 62 comprises processing circuitry 20 implementing a segmented scan editor 70 in the exemplary embodiment. The segmented scan editor 70 provides a sequence of pre-defined or user defined voltage waveforms for individual controlled voltage sources of analysis device 10. A user obtains fundamental control of analysis device 10 using the segmented scan editor 70 but not at the raw data level (at least in one configuration). Segmented scan editor 70 outputs data as a segmented scan 72. Segmented scan 72 is a sequence of voltage waveforms defined by one or more equation for individual controlled voltage sources plus control of relays and registers (e.g., controlling additional operations of analysis device 10 such as turning on/off a heater or other environmental control for example). The defined voltage waveforms of segmented scan 72 comprise digitized voltage waveforms defined by equations along with values for the respective equation parameters to be used for processing at the lower level 60. Scan configuration data of individual segmented scan 72 may comprise a unique name, an equation, and/or a list of parameters corresponding to the lower level (e.g., level 60) which may be used in generating the respective digitized waveform 66.

Segmented scan 72 may be compiled by processing circuitry 20 into the lower programming level 60 and used by digitized waveform editor 64 to generate the desired digitized waveforms 66. Accordingly, as illustrated by the example of FIG. 4, programming data from one level (e.g., level 62) may be compiled into a lower programming level of abstraction (e.g., level 60). Additional details regarding compilation are described below.

Processing circuitry 20 may also execute appropriate programming to implement a waveform configuration tool which allows a user to add user-defined constructs to a higher programming level to supplement existing constructs and which are based upon a lower programming level. Constructs may comprise building blocks or keywords for a given programming level. An added construct permits the user to gain additional programming control of analysis device 10 at a given level of programming abstraction. In the example of FIG. 4, the waveform configuration tool 68 may add one or more construct to the segmented scan editor 70 and which may be used to provide segmented scan data 72 which may be compiled into programming level 60. Additional details of adding constructs are described below.

Individual levels of programming abstraction (e.g., levels 60, 62) may comprise at least four applications components including parameter variables defined by a lower level, a user interface for the current level (e.g., editor or programming interface), algorithm to create data (e.g., constructs) in terms of or understood by the lower level, and a configuration tool to define a user interface to be used by a higher level. Individual levels of programming abstraction may include at least two input data components including values for parameters of components (e.g., variable number of parameters corresponding to the construct type described as P1, P2, P3 in the below example) and values for level specific parameters which apply to constructs at the respective level (e.g., totalNumberOfSamples in the below example). Individual levels of programming abstraction may further provide at least one output component comprising generated data by application of the respective algorithm to the input data.

Referring again to FIG. 3, the data to be processed by editor 64 may comprise an array of data points wherein individual data points represent a voltage. For segment 1, the data may be [1.00, 1.00, 1.00, 1.00, . . . ]. The data stream could be created by a text editor and the programming interface may simply comprise selecting the appropriate data file to use. The digitized waveform editor 64 would create the digitized waveforms 66 from the array of data points.

In a further example, the segmented scan programming level 62 may use the following constructs and associated parameter(s):

Fixed DC—the only parameter is the DC voltage value.

Linear Ramping DC—parameters are needed for the starting and ending DC voltages.

Sine—parameters are needed for the amplitude and frequency.

Ramping Sine—parameters are needed for the frequency and starting and ending amplitudes.

Broadband—parameters are needed for the starting and ending frequencies and amplitude.

For level 62, existing constructs may be used by the user to enter appropriate data at level 62. The entered data may be processed by segmented scan editor 70 to provide the data of segmented scan 72 which may be compiled into lower level 60. Exemplary existing constructs of level 62 for FIG. 3 may be represented as:

Segment 1: Fixed DC of value 1.000

Segment 2: Sine data with frequency of 2 MHz and amplitude of 2.000.

Segment 3: Ramping Sine data with frequency of 2 MHz, starting, amplitude of 0.750 and ending amplitude of 2.000.

Segment 4: Broadband waveform with starting frequency of 100 kHz, ending frequency of 1 MHz and amplitude of 1.750.

Segment 5: Linear Ramping DC with starting value of 0.000 and ending value of 1.750.

Referring again to programming level 60, digitized waveform editor 64 generates digitized waveform 66 comprising a data stream representing voltages. In one embodiment, the data stream is generated according to an equation. The data stream for a sine wave may be generated by editor 64 according to:

for (n=0; n<totalNumberOfSamples; n++)

$$\text{data}[n]=\text{sine}(2*PI*n*\text{frequency}/\text{samplesPerSecond})$$

wherein samplesPerSecond may be based upon hardware and totalNumbnerOfSamples may be based on duration of the waveform (in seconds) times the samplesPerSecond. Programming at level 60, the user may enter the above code changing values for frequency, totalNumberOfSamples, etc. each time they wanted to generate a new sine waveform. Alternatively, if programming at level 62, a user may access the sine wave construct, define values for the respective parameters, and processing circuitry 20 implementing editor 70 would insert the values into an equation corresponding to the sine wave construct providing segmented scan 72.

A user may access waveform configuration tool 68 if they wanted to add a new construct to segmented scan level 62 (e.g., in addition to the segment types already provided by the segmented scan editor 70) or any other level of programming abstraction. The user may add new constructs after usage of the analysis device 10. For an example of programming at the higher level 62, a user may wish to add a new construct defining a new waveform. Processing circuitry 20 executing appropriate programming to implement the configuration tool 68 may ask via a configuration editor a user to enter a name identifying the new construct (e.g., waveform type), the number of parameters, the parameter names, and an equation (e.g., corresponding to the waveform). The configuration tool defines the new construct in terms understood by the lower layer (e.g., equation having appropriate values to generate a waveform if the new construct is for level 62 to be used at level 60 by digitized waveform editor 64).

For example, if a user wanted to enter a third harmonic construct at level 62, the user may access the waveform configuration tool 68 which provides the following exemplary configuration interface via user interface 23 including fields wherein the user adds the appropriate information to create the construct comprising a new waveform equation executable by editor 64 to provide a digitized waveform 66:

| EDITOR QUERY | USER RESPONSE |
|---|---|
| New Segment Type Name: | Third Harmonic |
| Number of parameters: | 3 |
| Parameter name(P1): | Frequency |
| Parameter name(P2): | 1st harmonic amplitude |
| Parameter name(P3): | 3rd harmonic amplitude |

data[*n*]=sine(*n***P*1*2**PI*/samplesPerSecond)**P*2+sine(*n***P*1*6**PI*/samplesPerSecond)**P*3 Equation:

wherein data[n] is the voltage at point n. Following creation, the second programming level 62 may provide "Third Harmonic" as a construct option of programming for a user.

More specifically, following the creation of the construct (e.g., new waveform type), the programming circuitry 20 executing programming to function as a segmented scan editor 70 may present the following editor interface via user interface 23 to a user with appropriate fields to be filled in by the user to program the analysis device 10 at level 62:

| EDITOR QUERY | USER RESPONSE |
|---|---|
| Segment Type: | Third Harmonic |
| Parameters: | |
| Frequency: | 2000 KHz |
| 1st Harmonic Amplitude: | 5 v |
| 3rd Harmonic Amplitude: | 2 v |

Accordingly, following creation of the new construct, a user may identify the construct by name and fill in the appropriate parameters presented by the editor interface.

Following entry of the appropriate data via the segmented scan editor 70, the processing circuitry 20 executing the appropriate algorithm at the respective programming level (e.g., segmented scan editor 70) may generate the following code comprising the segmented scan 72 by replacing the parameters of the respective equation with the entered values in accordance with the desired processing of digitized waveform editor 64:

```
for (n=0; n<totalNumberOfSamples; n++)

data[n]=sine(n*2000000*2*PI/samplesPerSecond)
    *5+sine(n*2000000*6*PI/samplesPerSecond)*2
```

During compiling, processing circuitry 20 executing digitized waveform editor 64 may thereafter process the code of segmented scan 72 to generate the actual data stream comprising the digitized waveform 66.

Using the added construct, a user may program at level 62 and change a frequency or other desired value of the respective equation without having to reproduce the entire code to be processed by the digitized waveform editor 64.

Figure 5:
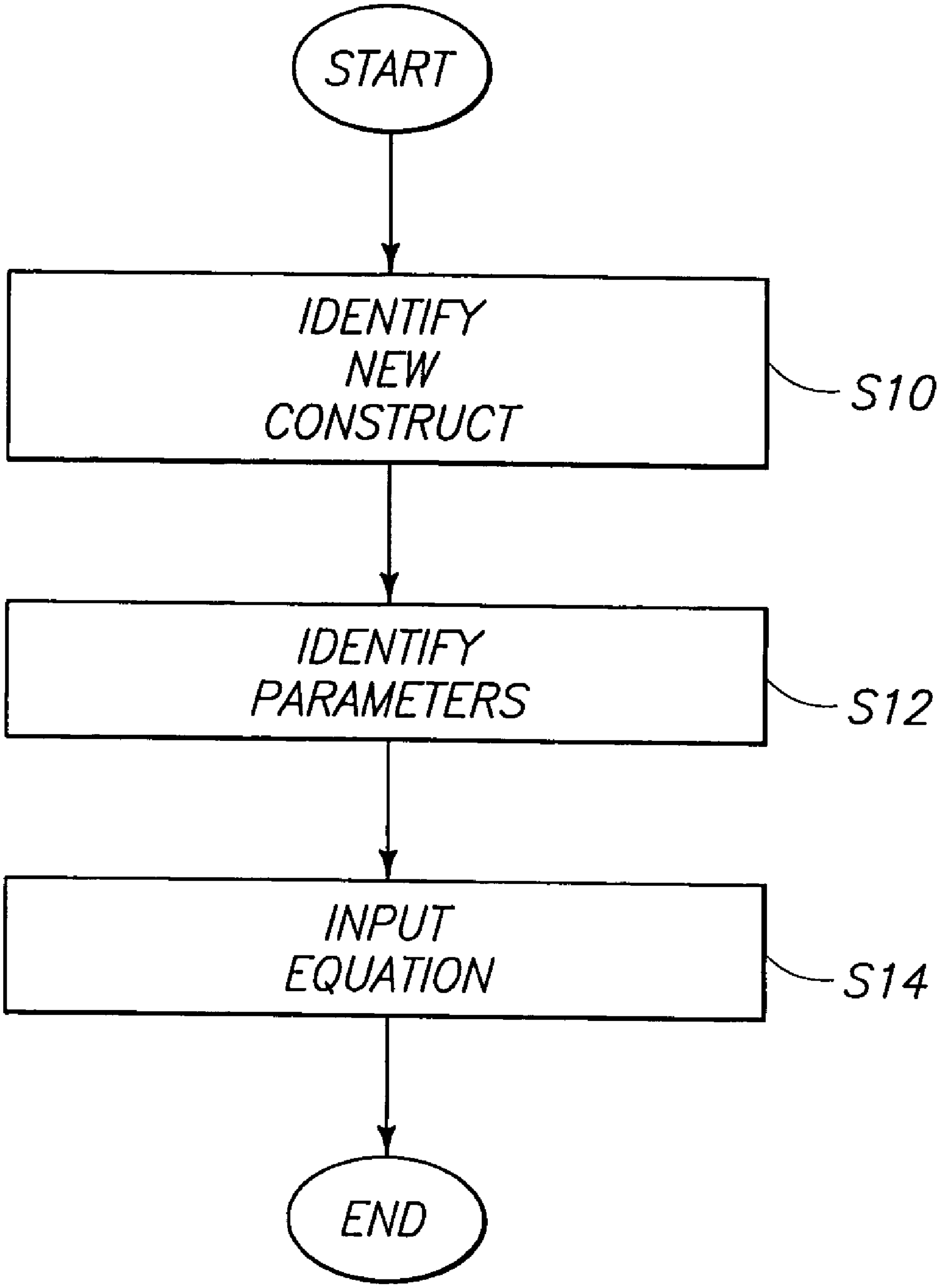
FIG. 5 is a flow chart of an exemplary method for adding a construct to a programming level according to one embodiment.

Referring to FIG. 5, an exemplary method for adding an additional construct to a given level of programming abstraction is illustrated. A user may use a configuration interface of the configuration tool to implement at least some of the method steps of FIG. 5. Other methods are possible including, more, less and/or alternative steps.

At a step S10, a user indicates a desire to create a new construct which is processed to provide data usable in another level of programming abstraction. The user may identify or name the new construct to be defined at step S10 (e.g., waveform type of third harmonic).

At a step S12, the user identifies the parameters to be presented to a user in an editor interface during subsequent usage of the construct to program the analysis device. Exemplary identification of parameters comprises frequency, first harmonic amplitude, or third harmonic amplitude in the example above.

At a step S14, the user inputs an appropriate equation which provides data for the next lower level and which may be executed during subsequent processing. Accordingly, in at least one example, the user defines the new construct in terms of the lower level (e.g., providing an equation and appropriate parameters corresponding to lower level 60 in the described example) which may be processed by the editor of the lower level. In other embodiments, levels higher than level 62 may be provided and such levels may include constructs defined in terms of level 62 enabling processing of data created according to such constructs by editor 70.

Figure 6:
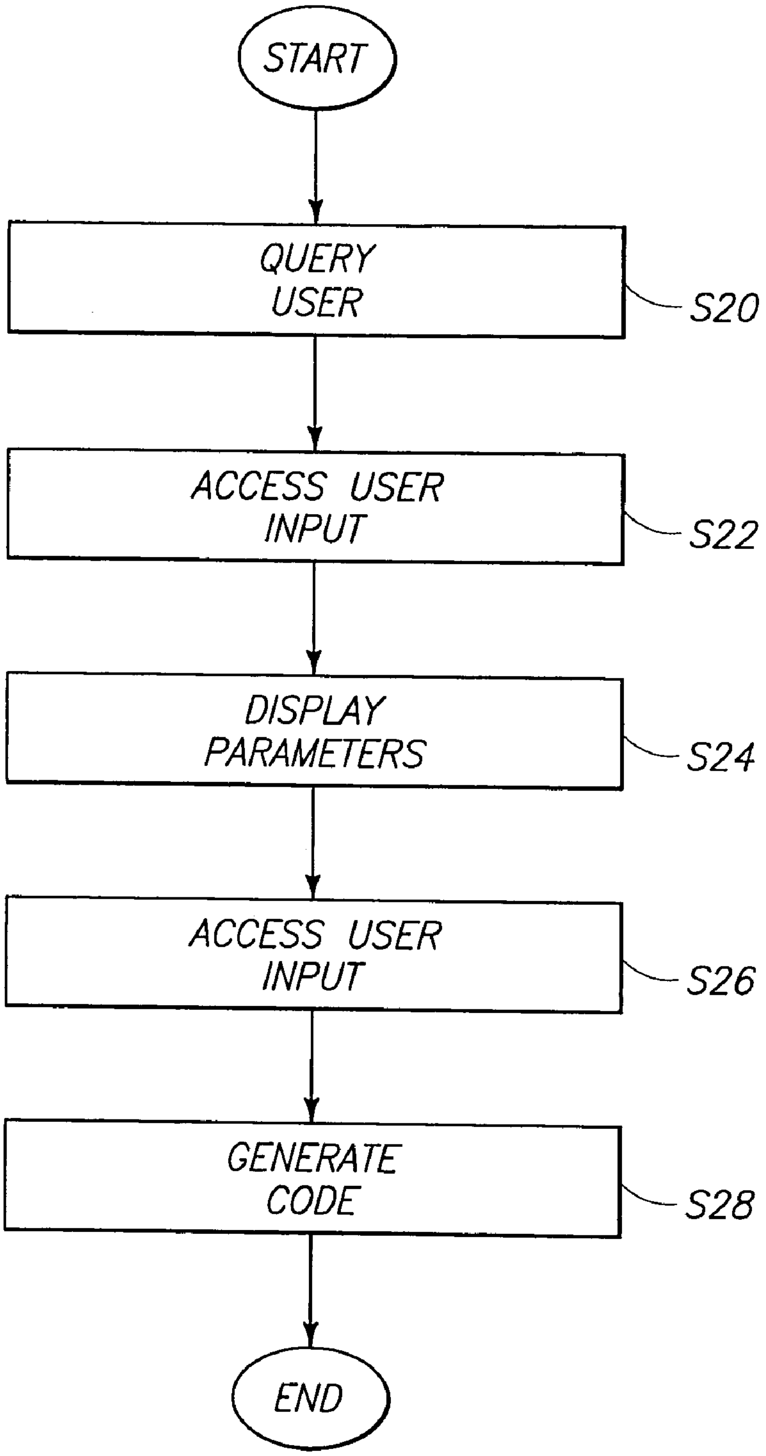
FIG. 6 is a flow chart of an exemplary method for processing data between different levels of programming abstraction according to one embodiment.

Referring to FIG. 6, an exemplary method for programming the analysis device at a desired level of programming abstraction is illustrated. A user may use a respective editor interface to implement at least some of the method steps of FIG. 6. Other methods are possible including, more, less and/or alternative steps.

At a step S20, an editor interface queries the user to identify the desired construct (e.g., type of waveform).

At a step S22, the user input identifying the desired construct is accessed by the processing circuitry.

At a step S24, the processing circuitry controls the user interface to display the appropriate parameters corresponding to the identified construct.

At a step S26, the user may input the appropriate data (e.g., parameter values requested via the interface) which is accessed by the processing circuitry.

At a step S28, the processing circuitry generates data (e.g., segmented scan 72) for usage by another level of programming abstraction. In one example, the processing circuitry accesses an equation associated with the construct and inserts values of parameters inputted by the user at step S26 into the equation. Thereafter, the generated data may be processed at a lower level of programming abstraction.

At least some aspects of the disclosure provide a plurality of levels of programming abstraction for programming an analysis device. A multiple layered configuration ability is provided for controlling the analysis device. Some aspects permit addition of user-defined constructs to one or more of the levels to assist a user with programming and to provide increased flexibility. In at least some aspects, the user may extend any given level of programming abstraction using a configuration tool to build constructs based upon a lower layer.

Figure 7:
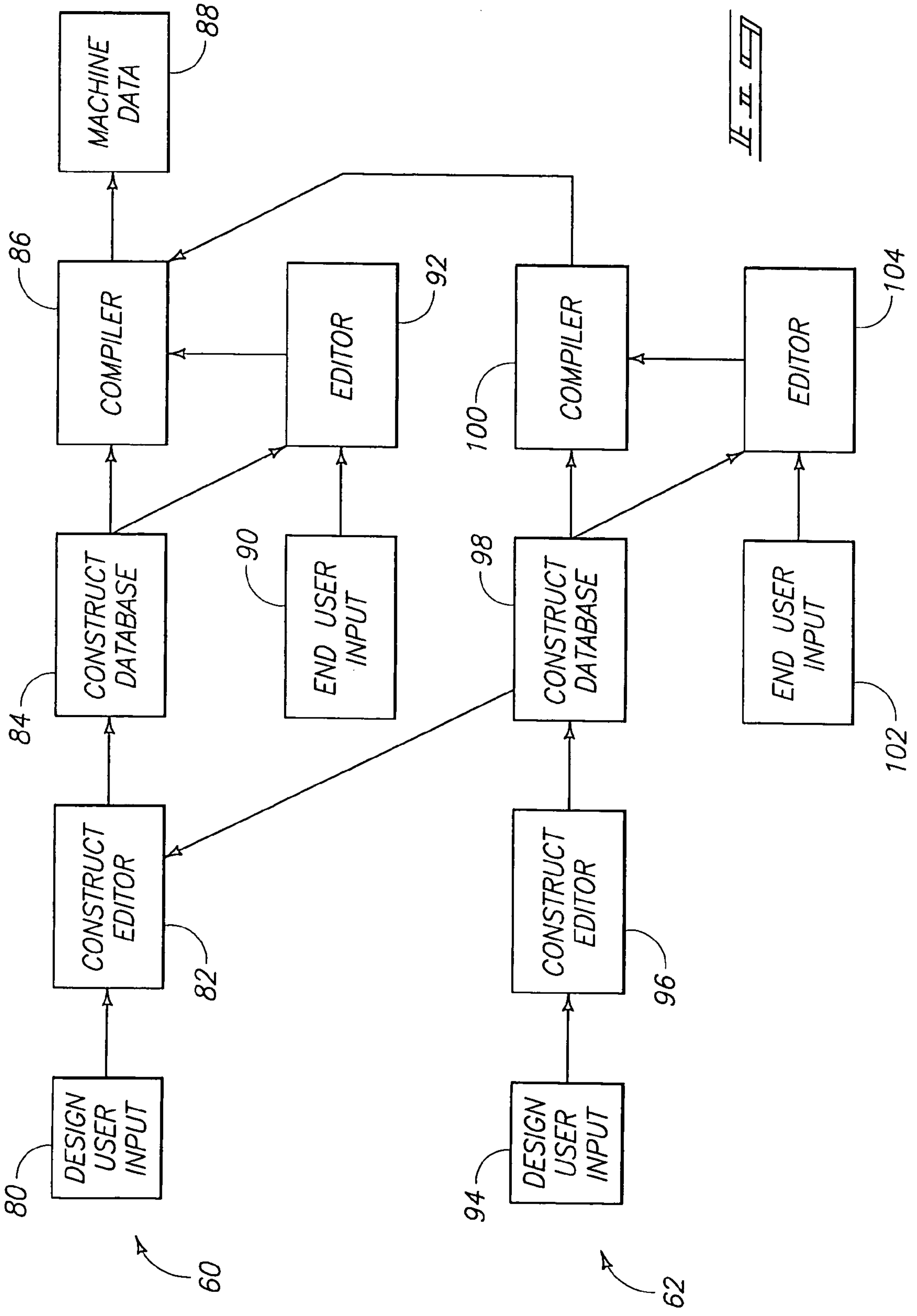
FIG. 7 is a functional block diagram of exemplary processing to convert data between different levels of programming abstraction and to create new constructs according to exemplary embodiments.

Referring to FIG. 7, details regarding exemplary entry and processing of input data entered via the different levels 60, 62 of programming abstraction, conversion of data between the levels 60, 62, and generation of new constructs usable at the levels 60, 62 are described according to illustrative embodiments. The functional blocks generally correspond to the functional block diagram of FIG. 4 of one possible implementation of device 10. Other embodiments or configurations are possible.

In the depicted embodiment of FIG. 7, level 60 includes a construct editor 82, construct database 84, compiler 86, and editor 92, and level 62 includes a construct editor 96, construct database 98, compiler 100 and editor 104. In general, construct database 84, editor 92, and compiler 86 may correspond to digitized waveform editor 64 of FIG. 4, and construct editor 96, construct database 98, compiler 100 and editor 104 may correspond to segmented scan editor 70 of the example of FIG. 4. Construct editors 82, 98 may be embodied within a configuration tool, such as waveform configuration tool 68, of FIG. 4 in one example. In one embodiment, construct databases 84, 98 may be implemented using storage device 21, and editors 82, 92, 96 and 104 and compilers 86 and 100 may be implemented by processing circuitry 20.

A user may input data 90 via editor 92 which comprises or may be used to specify values of device parameters (e.g., define values usable by components 26, 27, 28 and 30 and may include a stream of values to generate a waveform or a value which may remain constant during analysis of a sample). As discussed above, exemplary user input data 90 at level 60 may include an equation and appropriate values for parameters of the equation, values for device parameters, and/or other input pertinent to device parameters. Compiler 86 may access the inputted data (e.g., equation and values for the equation parameters entered by the user) from editor 92 and solve the equations using the values to calculate machine data 88 comprising a plurality of discrete values (e.g., a data stream of a plurality of digital values representing the amplitude of an analog waveform at a plurality of moments in time) also referred to as waveform data usable by waveform generators 22 to formulate one or more analog voltage waveforms. In higher levels of abstraction, editor 92 may access construct database 84 responsive to user input to generate appropriate data to be applied to compiler 86. For example, if not entered by a user, editor 92 may access a construct comprising an equation from construct database 84 and present a respective user interface to the user to assist with entry of input 90.

Construct editor 82 may be utilized to create new constructs, for example, responsive to design user input data 80 and the new constructs may be stored within construct database 84. Construct editor 82 may be omitted in some embodiments (e.g., wherein level 60 corresponds to the lowest level of programming abstraction). Construct database 84 is a repository of construct data (e.g., construct name, parameter list, equation) to be used by editor 92 and compiler 86. Other forms of constructs may be stored in other embodiments or for other levels of programming abstraction.

Compiler 86 operates to process a respective equation from construct database 84 to compile the input data of user input 90 (e.g., the compiler 86 may process the equation using the user inputted values to generate the machine data 88).

A user programming at a higher level of abstraction may program analysis device 10 by accessing editor 104 to enter user input data 102. Editor 104 may use a construct name, parameter list, and equation (if appropriate) to access construct database 98 to produce a user interface for the end user to assist with the provision of input 102 comprising parameter specific data in one embodiment. Construct database 98 is a repository of construct data (e.g., construct name, parameter list, equation) to be used by the respective compiler 100 and editor 104. Other forms of constructs may be stored in other embodiments or for other levels of programming abstraction.

In accordance with exemplary programming levels 60, 62, compiler 100 of level 62 uses an equation from construct database 98 to compile the input 102 from editor 104 (or a higher level of programming abstraction not shown in FIG. 7) to generate data to be provided to compiler 86 of level 60. As mentioned above, compiler 86 may process the received equation and parameters from compiler 100 (e.g., corresponding to segmented scan 72 in the embodiment of FIG. 4) to generate the machine data 88 comprising the discrete digital values usable to form the analog voltage waveforms. The user input data may be converted in form between the different levels of programming abstraction (e.g.; the data may comprise an equation with entered values for equation parameters at level 62 and the discrete digital values comprising the machine data 88 at level 60). For direct programming of device parameters of components 26, 27, 28 and/or 30, a user may enter input data comprising an optimization function wherein the processing circuitry 20 may calculate value(s) of one or more device parameters during processing to provide analysis control data (e.g., convert the data from the optimization indication to actual values during conversion of data between different levels such as 60, 62). Other conversion operations may be provided between other levels of programming abstraction in other embodiments.

Construct editor 96 may be utilized by a user to add new constructs for the respective programming level to construct database 98. A user may enter user input data 94 for the new construct for example, by providing a new name, new equation, list of parameters for the equation, etc. for the described exemplary level 62 of programming abstraction. Following the creation of a new construct at a given level of programming abstraction, a user may access and utilize the new construct to thereafter program the analysis device 10. Other types of constructs may be added to other (e.g., higher) levels of programming abstraction.

In compliance with the statute, the invention has been described in language more or less specific as to structural and methodical features. It is to be understood, however, that the invention is not limited to the specific features shown and described, since the means herein disclosed comprise exemplary forms of putting the invention into effect.

What is claimed:

1. A method for carrying out mass spectroscopic analysis of a sample comprising the steps of:

a) providing a sample to be analyzed within a mass spectrometer;

b) querying a user via an interface device to select one of a plurality of processes for generating a voltage waveform to be utilized to control ions of the sample according to their mass-to-charge ratio, the querying step having a plurality of selectable choices including:

i. selecting a manual input of discrete data values defining a voltage waveform; or ii. selecting a manual input of an equation defining a function from which discrete data values are generated to define a voltage waveform;

c) receiving an input on the basis of the selection carried out in the querying step;

d) providing the received input to a data processing element which converts either the user input discrete data values or the discrete data values resulting from the user input equation to digital discrete data for driving a waveform generator;

e) generating a first set of digital discrete data;

f) converting the first set of digital discrete data to an analog signal using a conversion circuit;

g) generating a voltage waveform to be utilized to control the ions of the sample according to their mass-to-charge ratio; and h) applying the generated voltage waveform to an electrode in the mass spectrometer to control motion of the ions of the sample.

2. The method of claim 1 further comprising the step of varying, during the application of the generated voltage waveform to the electrode, one or more characteristics of the voltage waveform selected from the group consisting of frequency, amplitude, and phase.

3. The method of claim 1 further comprising the step of storing the first set of digital discrete data on an addressed computer memory including a writing step for writing the first set of digital discrete data to a plurality of addressed locations of the addressed computer memory.

4. The method of claim 3 further comprising the step of outputting the first set of digital discrete data to the conversion circuit of step (f) using data regarding the addressed locations.

5. The method of claim 4 further comprising the step of generating a second set of digital discrete data.

6. The method of claim 5 further comprising the step of storing the second set of digital discrete data on the addressed computer memory including a writing step for writing the second set of digital discrete data to a plurality of additional addressed locations of the addressed computer memory.

7. The method of claim 6 further comprising the step of outputting the second set of digital discrete data to the conversion circuit of step (f) using data regarding the additional addressed locations.

8. The method of claim 7 further comprising repeating steps (f) through (g) using the second set of digital discrete data.

9. The method of claim 8 further comprising the step of conducting the outputting step of the first and second sets of discrete digital data in parallel.

10. The method of claim 4 where the outputting step is carried out at a substantially constant rate.

11. The method of claim 7 where the outputting step is carried out at a substantially constant rate.

12. The method of claim 9 where the outputting step is carried out at a substantially constant rate.

* * * * *

UNITED STATES PATENT AND TRADEMARK OFFICE

CERTIFICATE OF CORRECTION

PATENT NO. : 8,212,206 B2
APPLICATION NO. : 10/570707
DATED : February 27, 2007
INVENTOR(S) : Garth E. Patterson, James Mitchell Wells and Brent Rardin It is certified that error appears in the above-identified patent and that said Letters Patent is hereby corrected as shown below:

In the Specification

Column 9, lines 32-33 − Replace:

data[*n*]=sine(*n***P*1*2**PI*/samplesPerSecond)**P*2+sine (*n***P*1*6**PI*/samplesPerSecond)**P*3 Equation:

with:

Equation: data[*n*]=sine(*n***P*1*2**PI*/samplesPerSecond)**P*2+sine (*n***P*1*6**PI*/samplesPerSecond)**P*3

Signed and Sealed this
Eighteenth Day of February, 2014

Michelle K. Lee
*Deputy Director of the United States Patent and Trademark Office*